United States Patent

McClure et al.

Patent Number: 5,327,821
Date of Patent: Jul. 12, 1994

[54] ROUND BALER TWINE WRAPPER CONTROL MECHANISM

[75] Inventors: John R. McClure; John H. Freimuth, both of New Holland, Pa.

[73] Assignee: Ford New Holland, Inc., New Holland, Pa.

[21] Appl. No.: 74,646

[22] Filed: Jun. 11, 1993

[51] Int. Cl.$^5$ .......................... B65B 63/04; B65B 5/04
[52] U.S. Cl. .......................................... 100/5; 56/341; 100/88
[58] Field of Search .............................. 100/5, 87–89; 56/341, 343

[56] References Cited

U.S. PATENT DOCUMENTS

| | | | |
|---|---|---|---|
| 4,167,844 | 9/1979 | Freimuth et al. | 56/343 |
| 4,557,189 | 12/1985 | Schaible | 100/5 X |
| 4,779,526 | 10/1988 | Frerich et al. | 100/88 X |
| 4,870,812 | 10/1989 | Jennings et al. | 56/341 |
| 4,885,990 | 12/1989 | Mouret | 100/88 |
| 4,956,968 | 9/1990 | Underhill | 56/341 |
| 5,014,613 | 5/1991 | Merritt, III et al. | 100/5 |

OTHER PUBLICATIONS

Ford New Holland Round Balere Operator's Manual No. 42064030 Copies of the front cover, rear cover and page (4–21), Oct. 1992.

*Primary Examiner*—Stephen F. Gerrity
*Attorney, Agent, or Firm*—Frank A. Seemar; Larry W. Miller

[57] ABSTRACT

A round baler having a main frame, a tailgate pivotally connected to the main frame and an apron extending around a plurality of guide rolls disposed in the main frame and the tailgate. A pair of take up arms, rotatably mounted on the main frame, carry at least one additional guide roll for the apron. A bale forming chamber, including the apron, varies in size from a bale starting position to a full bale position. A pair of levers, connected to rotate with the take up arms, have attached thereto a tensioning mechanism to urge the take up arms to the bale starting position of the apron. The machine is provided with an automated system for wrapping the formed bale with twine including an improved control system for tripping the wrapping apparatus.

7 Claims, 7 Drawing Sheets

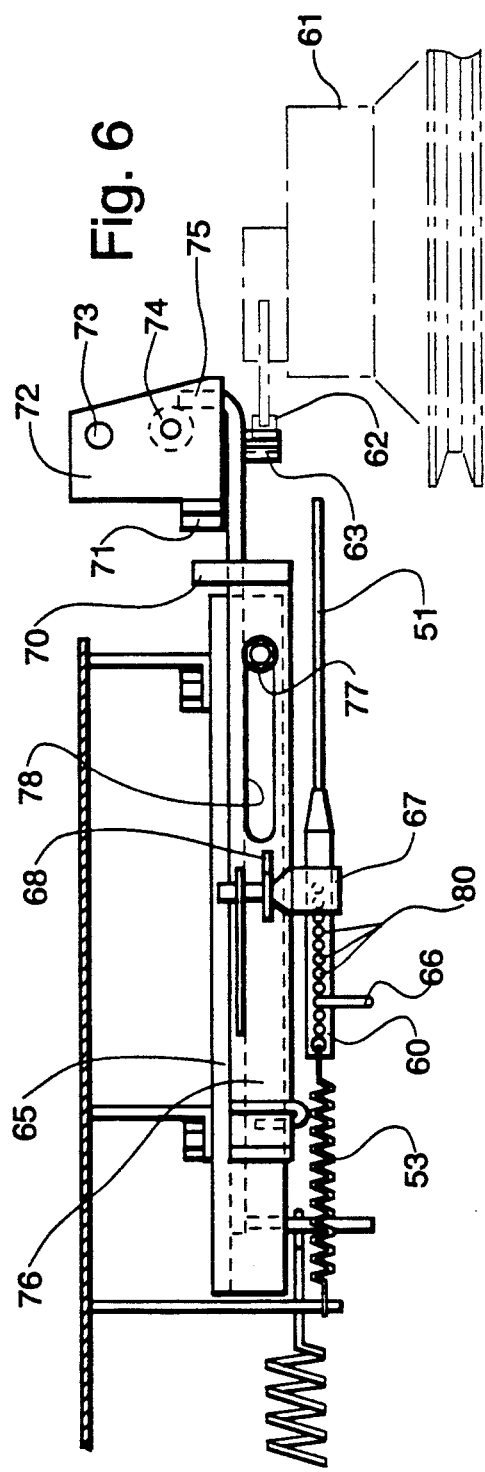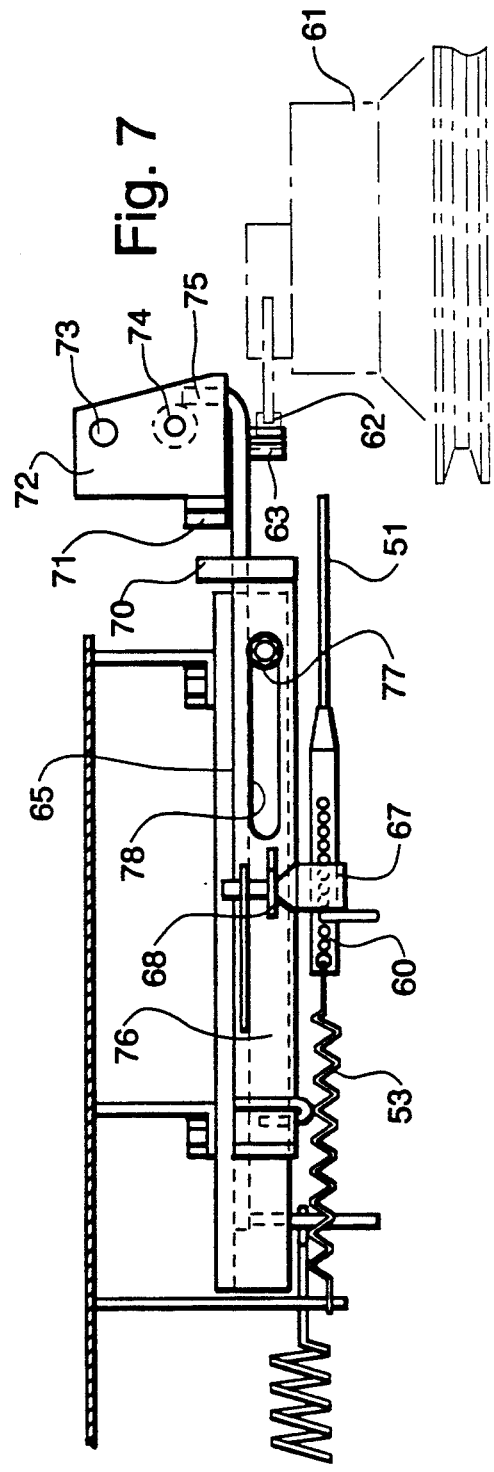

ROUND BALER TWINE WRAPPER CONTROL MECHANISM

FIELD OF THE INVENTION

The present invention relates generally to round balers and more particularly to an improved system for automatically tripping twine wrapping apparatus.

BACKGROUND OF THE INVENTION

Round balers generally have a bale forming chamber defined by an array of side-by-side belts, transverse slats trained on chains, a plurality of rolls or a combination of these various elements, e.g., rolls and belts. During field operation, crop material such as hay is picked up from the ground and fed into a fixed or adjustable diameter chamber. The hay is then rolled into a compact cylindrical package, wrapped with twine, net or the like and ejected onto the ground for subsequent handling.

Many balers of the type mentioned above employ automated or semi-automated systems to control one or more of the operational steps. It is common for these systems to include arrangements for varying the desired size of bales formed in the bale forming chamber. A successful arrangement of this type is disclosed in U.S. Pat. No. 4,167,844, issued Sep. 18, 1979 in the name of John H. Freimuth, et al, wherein an automatic twine wrapping apparatus is contemplated in which a triggering mechanism is actuated in response to a selected bale size in the forming chamber. Upon actuation, control means initiate automated steps of a twine wrapper including application of twine around the bale, severing the twine when the wrapping function is completed and resetting the system for the next wrapping operation.

In the patent mentioned above the apron take up arms move in response to change in bale size, i.e., the arms move as hay is being formed into a cylindrical package in the bale forming chamber. Take up arm position is monitored and used to initiate tripping of the mechanism that controls the wrapping apparatus. Other prior art balers have also used the position of the take up arms to initiate wrapping. For example, in U.S. Pat. No. 5,014,613, issued May 14, 1991 in the name of John H. Merritt, et al, a round baler of the type that uses rolls and belts to define the bale forming chamber is disclosed in which a twine wrapping trip mechanism is responsive to the position of the belt take up mechanism.

Both of the above mentioned balers are exemplary of prior art twine wrapper trip mechanisms with control systems that utilize linkages for coupling the take up arms to the control for the trip mechanism. Adjusting such systems for selecting bale size requires physical changes of the relationship of the elements.

Although prior art round baler twine wrapper control mechanisms for adjustable bale size have met with varying degrees of success, there is always a need for a less complicated and inexpensive system that enhances the overall operation of the round baler which in turn results in an improvement in overall performance and reliability of the machine.

SUMMARY OF THE INVENTION

An important object of the present invention is to provide an improved round baler twine wrapper control mechanism and thereby enhance overall baler performance.

In pursuance of this and other important objects the present invention provides an improvement for round balers having a a main frame, a tailgate pivotally connected to the main frame, a bale forming chamber defined by inwardly facing surfaces of crop conveying means which includes a plurality of side by side belts trained around a series of transverse guide rolls mounted in the main frame and tailgate, and means for feeding crop material into the chamber. The bale forming chamber expands from a bale starting position to a completed bale position as crop material is fed into the chamber and conveyed in a generally spiral path. A pair of take up arms are rotatably mounted on the main frame and at least one additional transverse guide roll extends therebetween. The belts are also trained about the additional guide roll. A pair of levers, connected to rotate with the take up arms, have attached thereto resilient means for maintaining tension on the belts by urging the take up arms to the bale starting position as the bale forming chamber expands. The baler further includes apparatus for wrapping a formed bale of crop material with twine and a system for automatically tripping the wrapping apparatus when the bale formed in the chamber attains a desired size. More specifically, the improvement contemplated comprises a cable, means for affixing one end of the cable to prevent movement during operation, means for resiliently mounting the other end of the cable, operative means extending from one of the levers for engagement with the cable to move it from a first position corresponding to the bale starting position of the chamber to a second position corresponding to the desired size of the bale in the chamber under conditions where the bale take up arms move from the bale starting position to the completed bale position, and means for automatically tripping the twine wrapping apparatus when the other end of the cable is moved to the second position.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 6 is a plan view taken in the direction of arrows 6—6 in FIG. 4.

FIGS. 7-10 are plan views, similar to the FIG. 6 plan view, showing a sequence of the relative positions of various elements of the twine wrapper control mechanism.

DESCRIPTION OF THE PREFERRED EMBODIMENT

Figure 1:
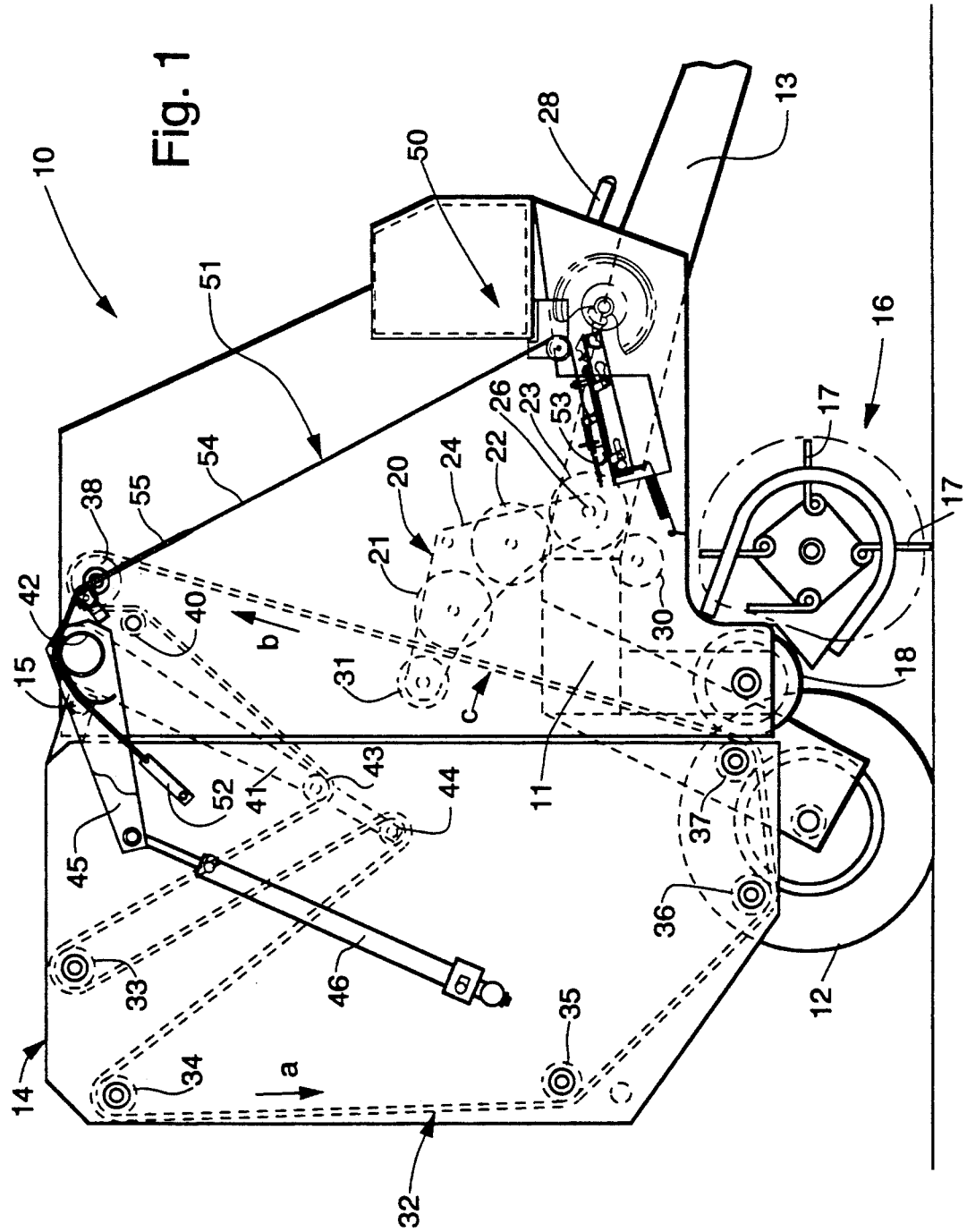
FIG. 1 is a diagrammatic side elevational view of a round baler in which the present invention is embodied.

Referring to the drawings, FIG. 1 shows a round baler 10 of the type having an expandable chamber defined by belts and rollers, as disclosed in U.S. Pat. No. 4,870,812, issued Oct. 12, 1989 in the name of Richard E. Jennings, et al.

Figure 2:
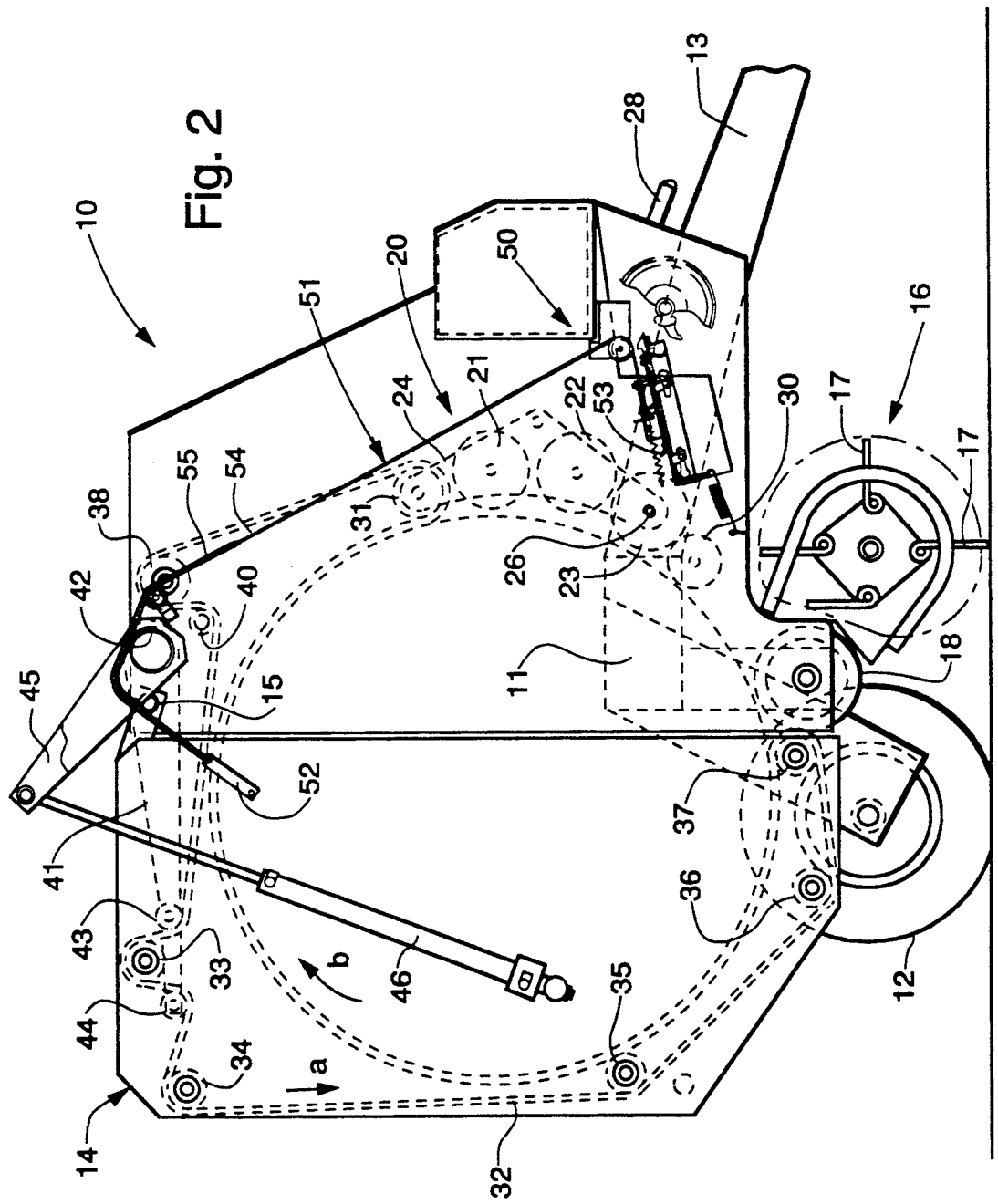
FIG. 2 is a diagrammatic side elevational view of the round baler shown in FIG. 1 in which the bale forming chamber has been changed from bale starting position to the full bale position.

Round baler 10, which incorporates the preferred embodiment of the present invention, includes a main frame 11 supported by a pair of wheels 12 (only one shown). A tongue 13 is provided for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, includes a plurality of tines 17 movable in a predetermined path to lift crop material from the ground and deliver it rearwardly toward a rotatably mounted floor roll 18.

A chamber for forming bales is defined partly by a sledge assembly 20 comprising a plurality of rollers 21, 22, 23 extending transversely in the arcuate arrangement seen in FIGS. 1 and 2. Rollers 21, 22, 23 are journalled at their ends in a pair of spaced apart arms 24, one of which is shown. These arms are pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction by conventional means coupled to a drive shaft 28 which is in turn connected to the power-take-off of a tractor. A starter roll 30, located adjacent roller 23, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 on sledge assembly 20 and idler roller 31, it is in engagement only with idler roller 31 and not roller 21 which is located in close proximity to the apron belts and serves to strip crop material from the belts, in addition to its bale forming function. Drive shaft 28 is also coupled to drive roll 38 which moves apron 32 along the varying paths indicated generally by arrows a and b in FIGS. 1 and 2. An additional guide roll 40 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Belt tension lever arms 45 (one shown) are also mounted on shaft 42 to pivot with take up arms 41, which carry additional guide rolls 43, 44 for supporting apron 32. A pair of hydraulic cylinders 46 are mounted on tail gate 14 and normally urge lever arms 45 and take up arms 41 toward their inner positions (FIG. 1).

When the elements of round baler 10 are disposed as shown in FIG. 1 with tailgate 14 closed, an inner course c of apron 32 extends between guide roll 37 and idler roll 31. Rollers 21, 22, 23 are inclined rearwardly on sledge assembly 20 to define with course c the bale core starting chamber. Apron inner course c forms the rear wall of the chamber while the inwardly facing peripheral surfaces of rollers 21, 22, 23 define in a general manner a rearwardly inclined cooperating front wall. Floor roll 18 defines the bottom of the chamber and starter roller 30, spaced from floor roll 18, provides an inlet for crop material.

As round baler 10 is towed across a field, pickup tines 17 lift crop material from the ground and deliver it through the inlet. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction to start a bale core. Continued feeding of crop material into the bale forming chamber by pickup tines 17 causes the apron inner course c to expand in length around a portion of the circumference of the bale core as the diameter increases. Take up arms 41 rotate conjointly with lever arms 45 from their inner positions shown in FIG. 1 toward their outer positions shown in FIG. 2 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the apron inner and outer courses of the belts of apron 32 to the locations shown in FIG. 1.

During bale formation, sledge assembly 20 also moves between bale starting position (FIG. 1) to full bale position (FIG. 2). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1 during bale ejection.

Now turning to prior art twine wrapping systems of the type operable by the present invention, reference is made to U.S. Pat. No. 4,167,844, mentioned above, directed to an automatic twine system having a triggering mechanism actuated in response to selected bale size. This patent discloses a baler having a chain and slat apron. In a subsequent patent, U.S. Pat. No. 5,014,613, also mentioned above, a baler is disclosed having a chamber defined by belts and rolls. In this patent a twine wrapper trip mechanism is also disclosed that is responsive to selected bale size. Pertinent subject matter of these patents is incorporated by reference.

Figure 3:
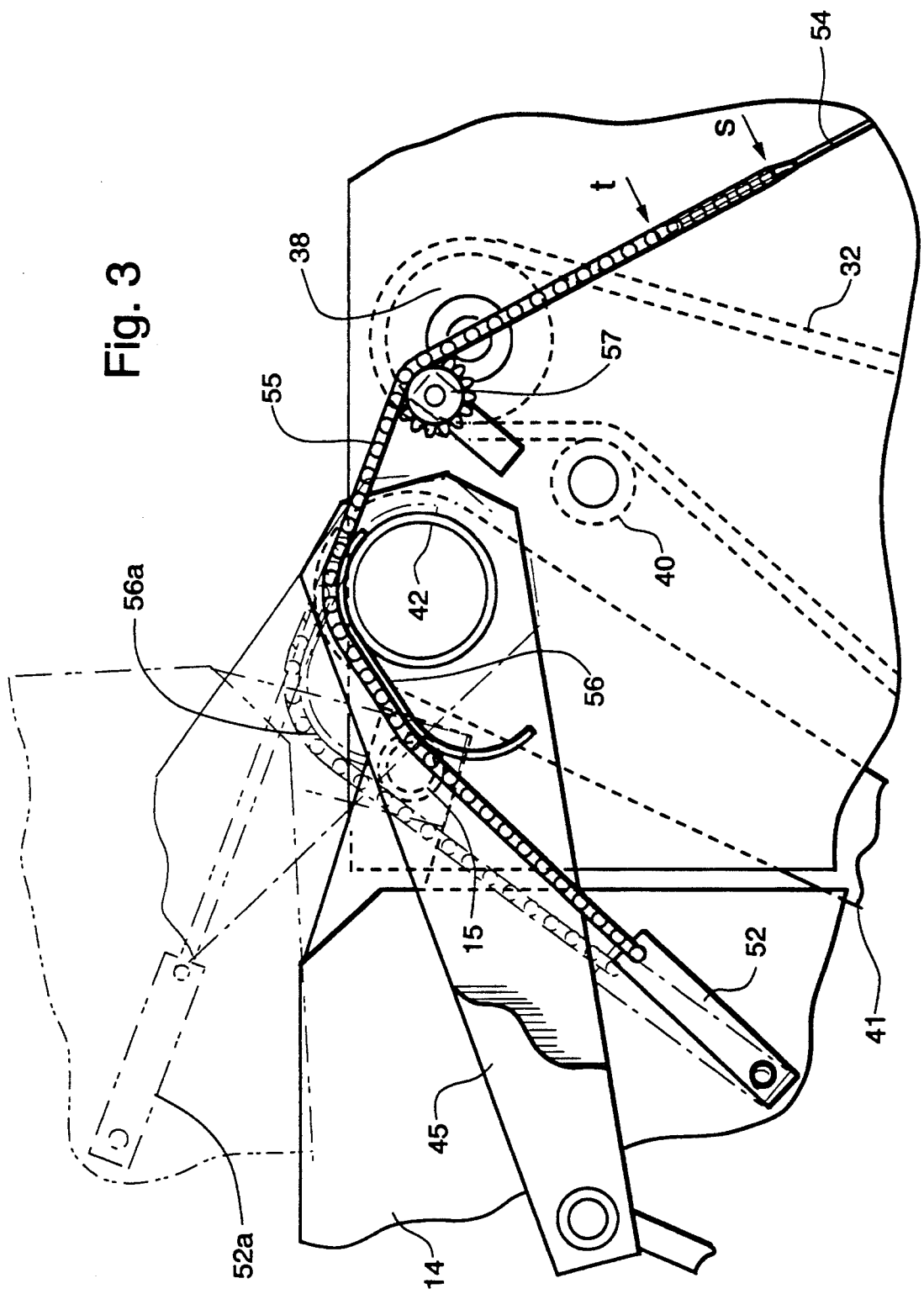
FIG. 3 is a side elevation of an enlargement of a portion of the baler shown in FIGS. 1 and 2.

In FIGS. 1 and 2 a twine wrapper trip mechanism, generally designated by reference numeral 50, is shown in its bale starting and completed bale positions, respectively. One end of a cable 51 is affixed to tail gate 14 by a pivotable strip 52 and the other end is resiliently mounted by a spring 53. Cable 51 comprises a wire portion 54 and a chain portion 55. Referring now to FIG. 3 in which the present invention is shown in more detail, arrow s shows the position of the juncture of the chain and wire portions under bale starting conditions and arrow t shows the juncture position when a bale has been completed. The chain portion 55 is trained about a unique cam plate 56 and a sprocket 57. The cam plate 56 is mounted on lever arm 45 and moves from the solid position shown to the phantom position 56a shown. This effectively lengthens the path of chain portion 55 resulting in a corresponding movement of the juncture from s to t. Substantially, the entire surface of cam plate 56 engages the chain when it is raised with lever arm 45 to position 56a, i.e., the full bale position of take up arms 41. This is a simple, economical technique of accurately moving cable 51 which has proven to be consistently reliable under field conditions.

Figure 4:
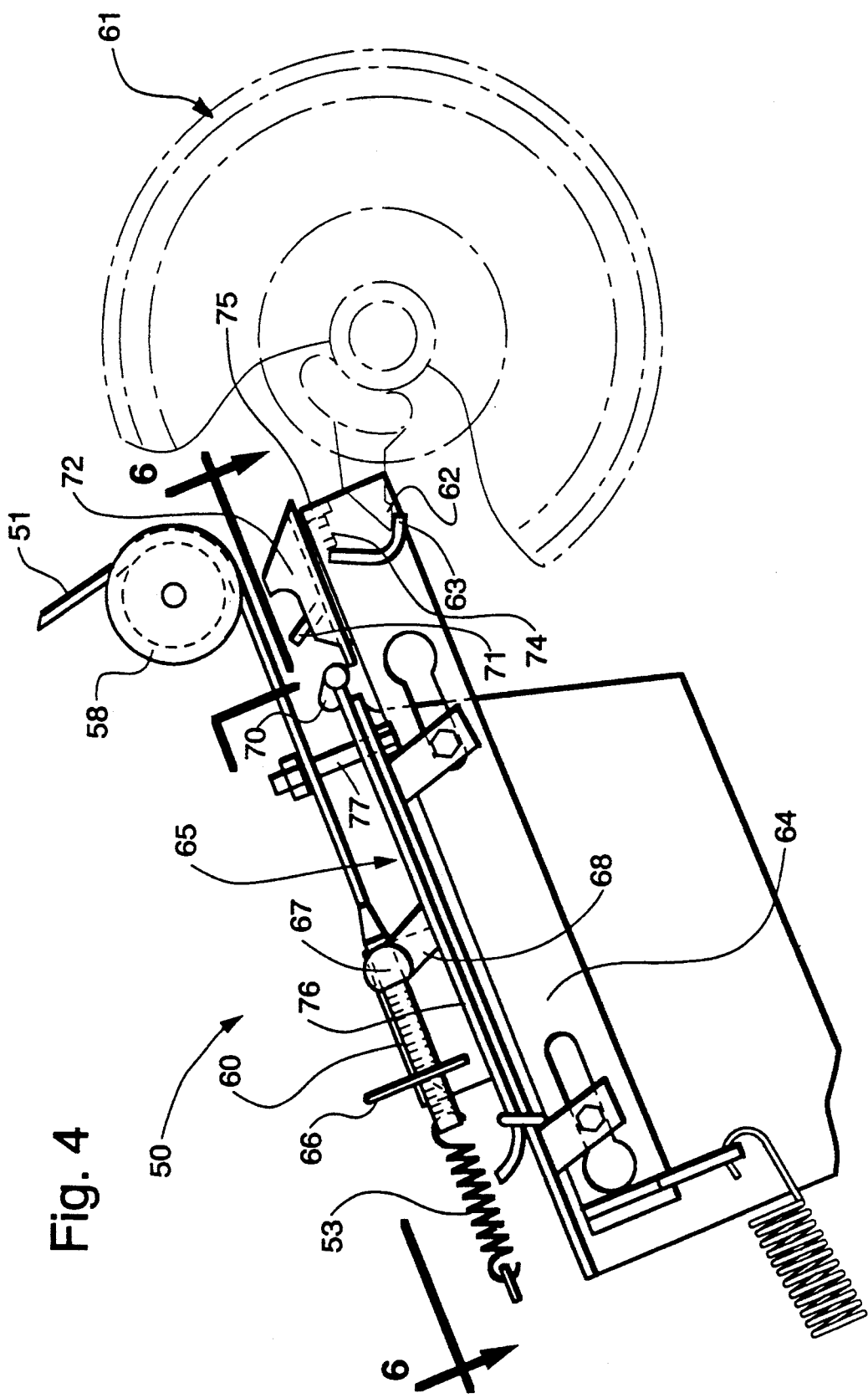
FIG. 4 is a side elevation of an enlargement of a mechanism on the baler shown in the empty chamber condition of the baler shown in FIG. 1.
Figure 5:
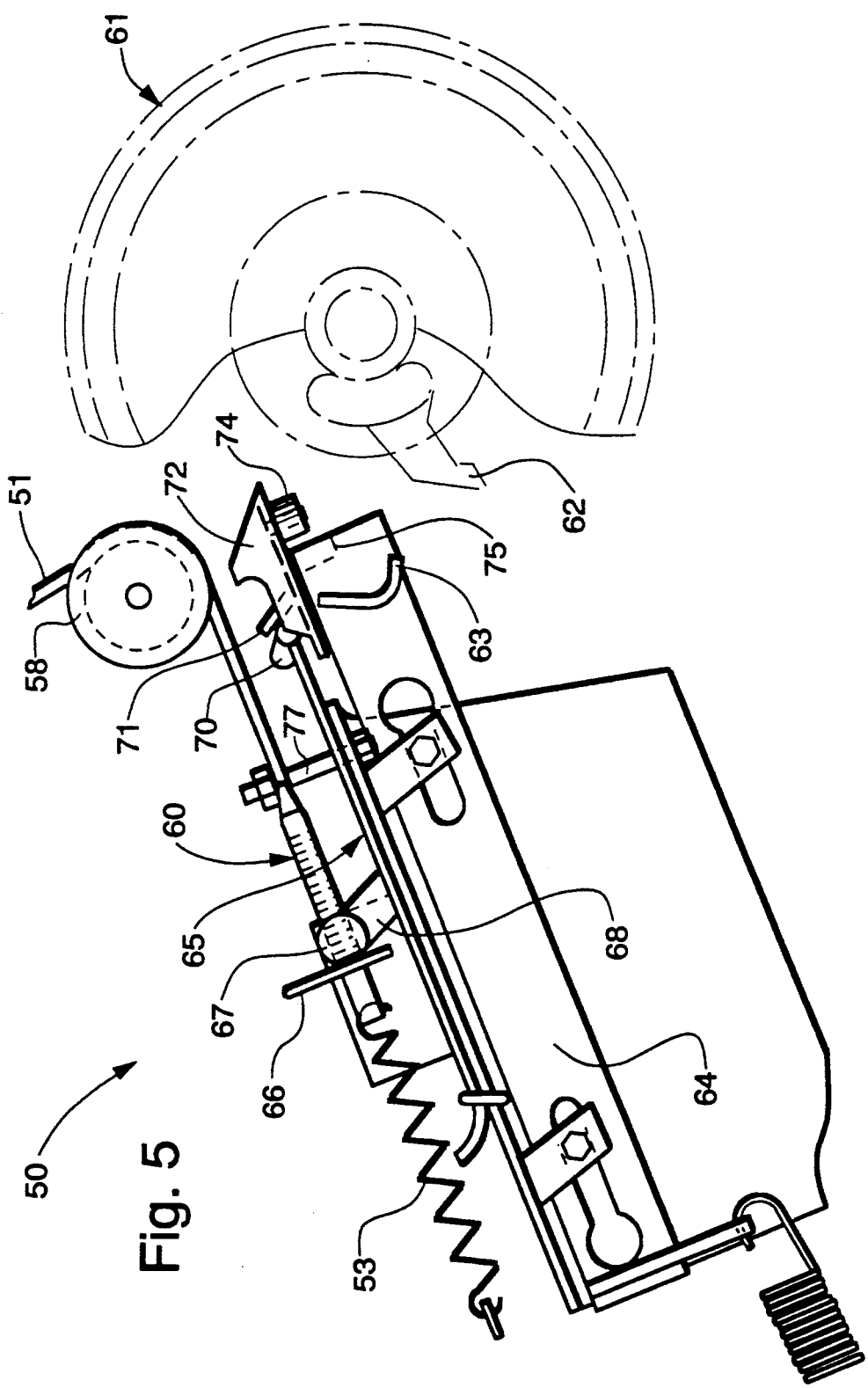
FIG. 5 is a side elevation of the same mechanism as shown in FIG. 4 baler but in the full chamber condition shown in FIG. 2.

Turning now to the overall operation of the system, trip mechanism 50 is shown in detail in FIGS. 4 and 5, where FIG. 4 shows the bale starting position corresponding to FIG. 1 and FIG. 5 shows the completed bale position corresponding to FIG. 2. Cable 51 is trained around a pulley 58 and affixed to cable tensioning spring 53 via a rod 60. A clutch mechanism 61 is shown in phantom for operating a twine wrapper mechanism, not shown. In FIG. 4 a pawl 62 is held against a stop 63 affixed to a sliding member 64, and in FIG. 5 pawl 62 has been released. This is initiated by the movement of a sliding assembly 65 from the position shown in FIG. 4 to the position shown in FIG. 5. A pin 66 extending from rod 60 is urged against a trunnion 67 that is an integral part of sliding assembly 65 and extends transversely from an intermediate tab 68. A finger 70, also an integral part of sliding assembly 65, is forced against an abutment 71 when cable 51 is pulled from position s to position t. Abutment 71 extends from a tripping cam plate 72 which is biased to rotate in a counter clockwise direction about a shaft 73, as shown in FIG. 6. A roller 74 mounted on plate 72 impedes the travel of a release arm 75, normally urged from right to left.

Continuing with the operation, the elements of trip mechanism 50 are initially disposed in the conditions shown in FIGS. 4 and 6, i.e., rod 60 is held in place by spring 53, release arm 75 is urged against roller 74, pawl 62 is abutted against stop 63 and the transverse body portion 76 of assembly 65 is held against a guide pin 77 via a slot 78. In FIG. 7 the elements are shown in a condition where the bale is being formed in the chamber causing cable 51 to pull against spring 53 resulting in pin 66 and rod 60 to move toward trunnion 67. Sliding assembly 65 has not moved from its initial bale starting position.

Figure 8:
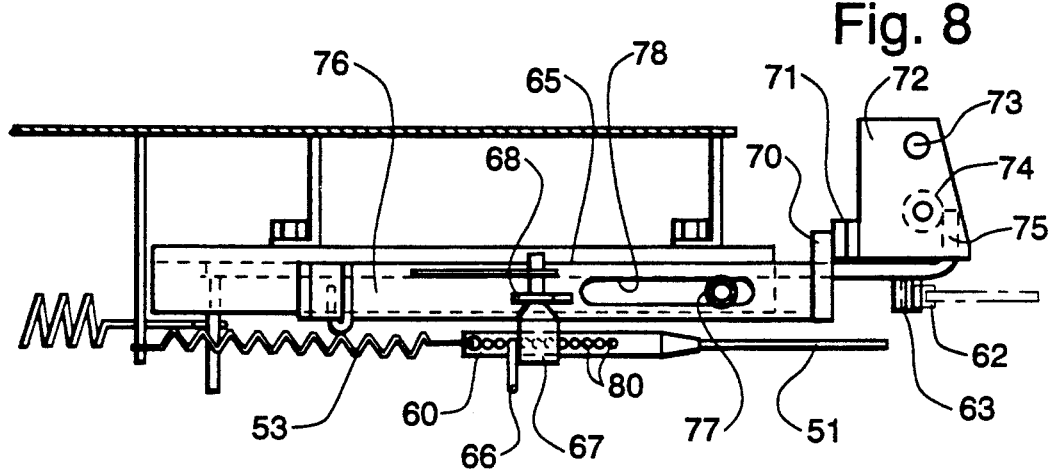
Figure 9:
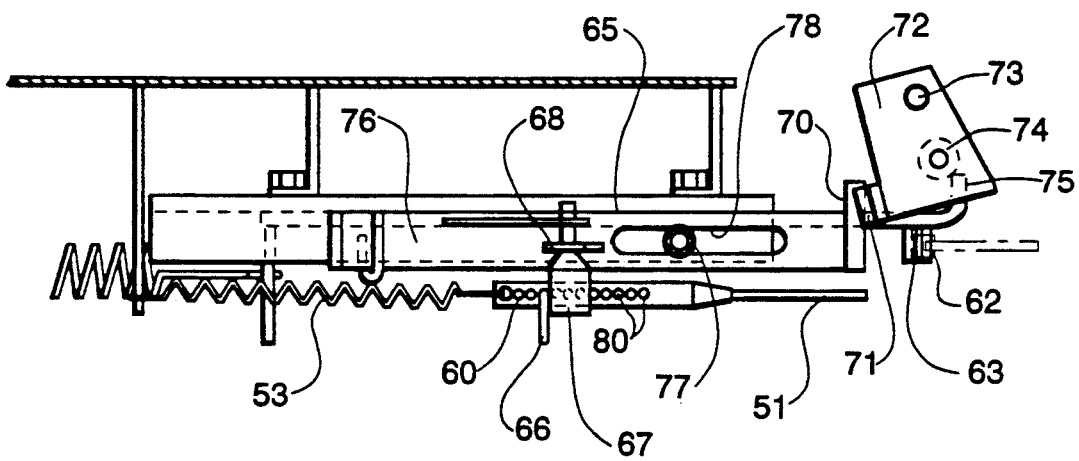
Figure 10:
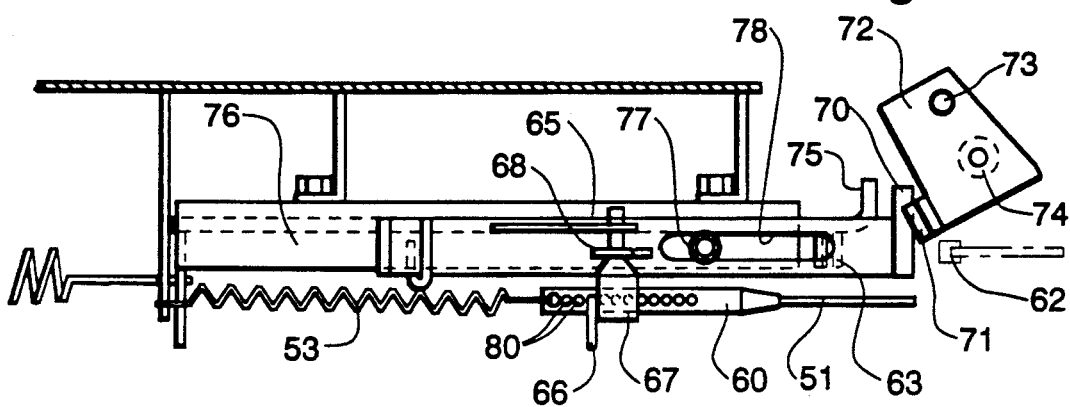

As the bale continues to increase in diameter in the chamber, pin 66 is forced against trunnion 67 causing slide assembly 65 to move in concert with rod 60 eventually causing finger 70 to contact abutment 71 as shown in FIG. 8. Rotation of tripping cam plate 72 is then initiated (FIG. 9) whereupon roller 74 moves in a counter clockwise direction around shaft 73 until it is clear of release arm 75 (FIG. 10) which then springs back toward its initial position and thereby removes pawl 62 from stop 63, which in turn launches the twine wrapping operation in a known manner. Cable 61 remains under tension while wrapping takes place. When tail gate 14 is raised to discharge the wrapped bale from the chamber, pivot strip 52 moves to its uppermost position 52a (see FIG. 3) and in so doing shortens the path of the cable and returns it to the position identified by arrow s permitting rod 60 to be pulled back to the initial position shown in FIG. 6. To complete the transition back to bale starting position, release arm 75 is reset, pawl 62 reengages stop 63 and slot 78 in transverse body portion 76 abuts against guide pin 77.

The selective insertion of pin 66 in the series of apertures 80 in rod 60 determines the point at which the triggering mechanism initiates the wrapping apparatus and various other functions, such as an operator alarm in the tractor cab. When pin 66 is in the leftmost aperture the mechanism is set to trigger for a maximum size bale which decreases when apertures are selected in a left to right direction until a minimum size is reached at the rightmost aperture.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a round baler having a main frame, a tailgate pivotally connected to said main frame, a bale forming chamber defined by inwardly facing surfaces of crop conveying means which includes a plurality of side by side belts trained around a series of transverse guide rolls mounted in said main frame and said tailgate, means for feeding crop material into said chamber, said bale forming chamber expanding from a bale starting position to a completed bale position as crop material is fed into said chamber and conveyed by said conveying means in a generally spiral path, a pair of take up arms rotatably mounted on said main frame, at least one additional transverse guide roll extending between said take up arms and about which additional guide roll said belts are also trained, a pair of levers connected to rotate with said take up arms, said levers have attached thereto resilient means for maintaining tension on said belts by urging said take up arms to the bale starting position as said bale forming chamber expands, apparatus for wrapping a formed bale of crop material with twine, and a system for automatically tripping said wrapping apparatus when the bale formed in said chamber attains a desired size, the improvement comprising a cable, means for affixing one end of said cable to the baler to prevent movement during operation and means for resiliently mounting the other end of said cable, means extending from one of said pair of levers for operative engagement with said cable to move said other end of said cable from a first position corresponding to said bale starting position of said chamber to a second position corresponding to said desired size of said bale in said chamber, and means for automatically tripping said twine wrapping apparatus under conditions where said other end of said cable is moved to said second position.

2. In a round baler as set forth in claim 1 wherein said means extending comprise guide means on which said cable travels along a path that increases under conditions where said lever moves conjointly with said take up arms as said arms move from the bale starting position to the completed bale position.

3. In a round baler as set forth in claim 2 wherein said guide means comprises a cam surface extending outwardly from said lever, and said cable is trained about said cam surface in a manner whereby the amount of surface in contact with said cable increases as said bale forming chamber expands.

4. In a round baler as set forth in claim 1 wherein said means for affixing said one of said cable is mounted on said tailgate.

5. In a round baler as set forth in claim 4 wherein said means extending comprise guide means on which said cable travels along a path that increases under conditions where said lever moves conjointly with said take up arms as said arms move from the bale starting position to the completed bale position.

6. In a round baler as set forth in claim 5 wherein said guide means comprises a cam surface extending outwardly from said lever, and said cable is trained about said cam surface in a manner whereby the amount of surface in contact with said cable increases as said bale forming chamber expands.

7. In a round baler as set forth in claim 6 wherein said means for affixing is moved along an arcuate path when said tailgate is lifted causing said cable to lift from a portion of said cam surface resulting in a decrease in the amount of cam surface in contact with said cable whereby said other end of said cable is returned form said second position to said first position.

* * * * *